Feb. 23, 1971     H. POMERNACKI     3,564,948
DRILL
Filed Dec. 6, 1968
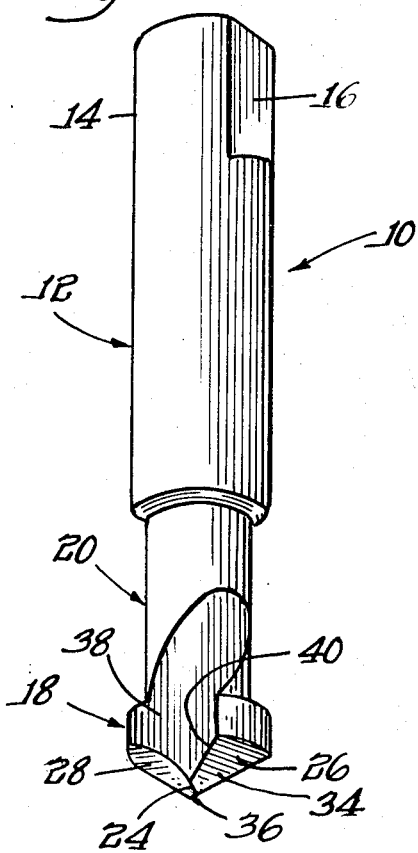
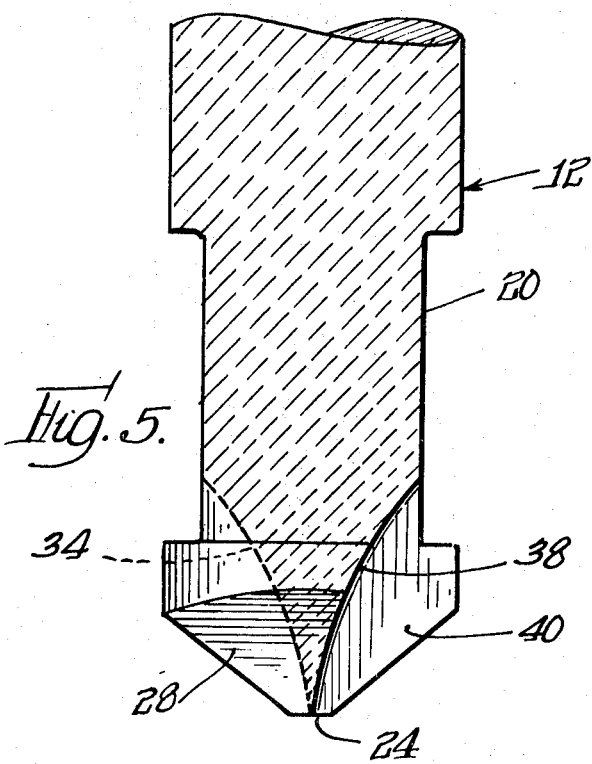
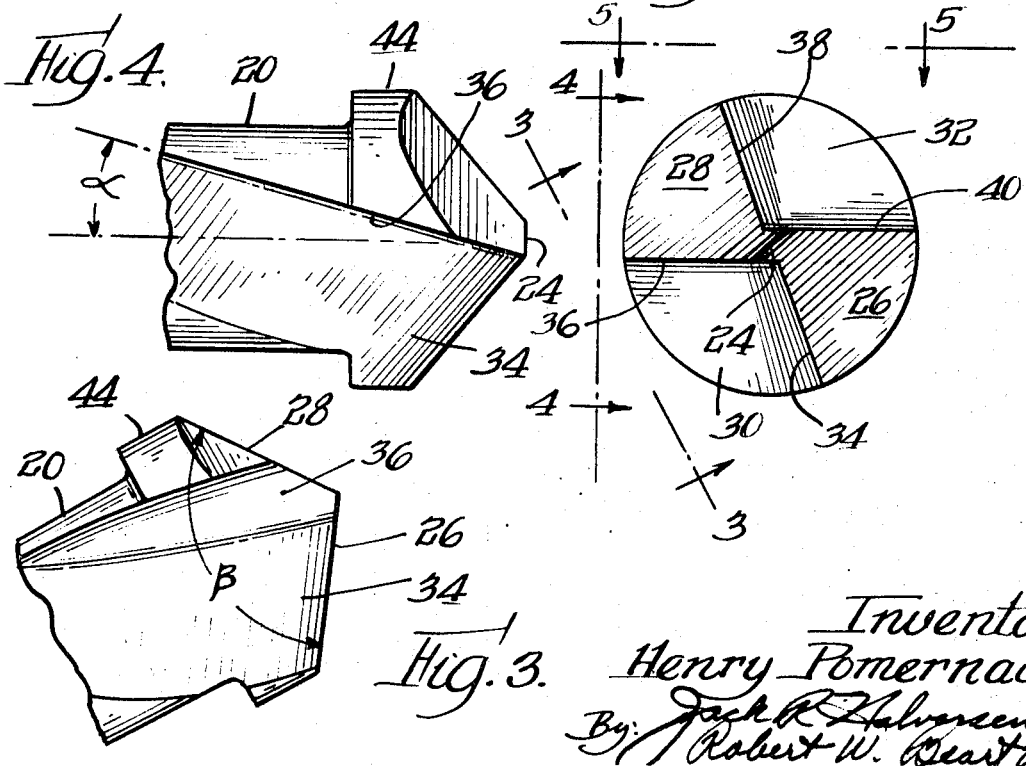
Inventor
Henry Pomernacki

United States Patent Office 3,564,948
Patented Feb. 23, 1971

3,564,948
DRILL
Henry Pomernacki, Northbrook, Ill., assignor to Illinois Tool Works, Inc., Chicago, Ill., a corporation of Delaware
Filed Dec. 6, 1968, Ser. No. 781,741
Int. Cl. B23b 51/02
U.S. Cl. 77—70                                 15 Claims

ABSTRACT OF THE DISCLOSURE

The invention relates to a double flute drill having angularly disposed oppositely positioned slots serving as flutes on a drilling end or tip, a reduced shank portion, and a second shank portion for cooperation with a tool for rotating the drill. The aim of the invention is to provide a drill capable of being used for a series of operations and which is inexpensive enough to be disposed of rather than being resharpened.

BACKGROUND OF THE INVENTION

In the field of twist drills it is common to provide a drill having a longitudinally extending shank with a plurality of helically disposed flutes extending along a substantial portion of the length of the drill for ejection of chips from the surface of the work material which are generated by the cutting action of the tip of the drill. A great variety of tip configurations such as split points presenting a pair of cutting points leading into the flutes of the drill, spade points which are relieved both axially and radially to provide a cutting edge and point as well as other configurations are present in the prior art. A variety of configurations of the flutes both in the grooves and on the lands are also in the prior art. The cost of producing all of these features in a twist drill often exceed the functional requirements of producing an aperture in a workpiece. Because of the high initial cost most users of twist drills will resharpen such drills to economically justify their purchase. Additionally, the design of most twist drills has been done with the basic assumption that the drill will be utilized with a fixed drill press rather than in a hand held tool which is subject to vibration and manipulation by the operator.

SUMMARY

The present invention is directed to a drill having a drilling tip with a diameter equal to the hole which is to be produced, said tip having a limited axial extent and joined to a reduced diameter shank portion which in turn is connected to the remainder of the shank. The tip is provided with a drilling point and at least two slots extending axially and radially away from said point and said point being relieved behind said cutting edges to effect the cutting of the material of the workpiece to form the aperture. The reduced shank section, with which the slots are in communication, serves to accept the chips generated by the drilling tip and the cutting edges defined by said slots.

An object of the invention is to provide a simple effective drill which can be used for a multiple number of drilling operations but which is economical enough to permit its being disposed of following these operations rather than being resharpened upon becoming dull.

A further object of the invention is to provide a novel drill which is so constructed that it may be easily started into a workpiece without prior center punching of the workpiece.

Another object of the present invention is to provide a novel drill capable of providing increased drilling speeds.

Other objects and advantages of the present invention will become apparent from the following description and the accompanying drawings wherein:

FIG. 1 is a perspective view showing the drill incorporating the features of the present invention;

FIG. 2 is an end view of the drilling point of the drill of the present invention;

FIG. 3 is a partial side view of the drilling tip as seen along lines 3—3 of FIG. 2;

FIG. 4 is a partial side view with the drill rotated and as seen along lines 4—4 of FIG. 2; and FIG. 5 is a partial view in section of the drill as viewed along lines 5—5 of FIG. 2.

Referring now more specifically to the drawing wherein like parts are designated by the same numerals throughout the various figures, a drill 10 incorporating the features of the present invention comprises an elongated shank 12 having one end portion 14 capable of being associated with a tool for turning the drill. If desired, a flat 16 may be provided at its extremity for engagement with a tang in the tool to insure positive rotation, although this is not a necessary feature of the invention and therefore optional.

At the opposite extremity of the shank there is provided an entering or drilling portion 18 having a first predetermined diameter. The shank also includes a reduced diameter or relieved third portion 20 which connects the drilling portion 18 to the driving portion 14. While the reduced portion 20 is shown as having a smaller diameter than either the drilling portion 18 or the driving portion 14 it must be realized that the driving portion 14 can be of the same, or even smaller diameter as portion 20 should this be desirable. However, for the purposes of the present invention it is only necessary that the reduced portion 20 have a smaller diameter than the predetermined diameter of the drilling portion 18, for purposes best set forth hereinafter.

The entering end or drilling portion 18 has a centered tip which includes a terminal ridge edge 24 which intersects and is substantially perpendicular to the longitudinal axis of the shank. On opposite sides of this edge flat surfaces 26 and 28 are provided and are symmetrical with one another relative to the terminal ridge and the longitudinal axis of the shank. The flat side surfaces 26–28 diverge angularly outwardly and away from the terminal ridge edge, with an included angle $\beta$ as shown in FIG. 3, and intersect the shank periphery intermediate the edge 24 and the reduced portion 20. It has been found preferable that the surfaces 26 and 28 form an included angle $\beta$ between the limits of 105° to 110°. The preferred method of forming the flat surfaces 26–28 is to restrain the drill blank against rotation and expose the free end to one or more milling cutters configured or disposed so as to cut and define the desired disposition of said surfaces 26–28.

A pair of oppositely disposed substantially longitudinally extending slots 30 and 32 defined by first and second side surfaces 34–36 and 38–40, respectively, extend through said drilling portion 18 and a part of said reduced portion 20. The first and second side surfaces 34–36 and 38–40, respectively, are preferably disposed at an angle substantially in excess of 90° relative to each other. In the preferred embodiment illustrated this angle is approximately 110°. Additionally, the first side surfaces 36 and 40 of the slots 30 and 32, respectively, are preferably inclined at an angle $\alpha$ with respect to a plane containing the longitudinal axis of the drill. The angle of inclination of first side surfaces 36 and 38 is such that the portion of the first side surface of each of said slots located in the trailing portion of the shank lies on a line traversing the said plane at an acute angle $\alpha$ intermediate the tip portion of the screw and the reduced portion as shown in FIG. 4. In the preferred embodiment the angle $\alpha$ is at least 15°.

The slots defined by the first side surfaces are disposed at an angle of less than 45°, and preferably at 40°, to said terminal ridge edge, as seen in FIG. 2 to utilize the radial fall off of the surfaces 26 and 28 to provide a relief behind the cutting edges. It can further be seen in FIG. 2 that each of said first side surfaces of said slots extend from the drill periphery radially into and beyond the terminal ridge edge thereby intersecting both of the symmetrically disposed flat side surfaces on opposite sides of the terminal ridge edge. This results in said pointed tip presenting a small axially extending projection defined by the aforementioned terminal ridge together with said flat side portions on either side thereof which are not intersected by said slots. This projection is adapted for initially engaging and removing material from a workpiece and is aggressive enough to substantially eliminate walking of the drill without the necessity of center punching the workpiece and also to provide an aggressive material removing means for cutting into the workpiece.

Further, the first side surfaces 36 and 40, of said slots 30 and 32, respectively, provide the cutting edges radially outwardly of said point portion to the first predetermined diameter of the entering end portion of the drill as well as the edge cutting portions along the cylindrical periphery 44 which terminates at the reduced third portion 20.

Preferably, the axial extent of the cylindrical side wall portion or periphery 44 of the entering end or drilling portion 18 has an axial extent which is less than the radius of said drilling portion 18 to provide a limited axial bearing surface which, by its limited extent, reduces frictional contact between the drill and the complementary aperture formed in the workpiece.

Referring now to FIG. 5, the preferred way to produce the slots in a drill embodying the teachings of this invention is to utilize a pair of circular cutters each having the preferred included angle of 110° between their side face teeth and their peripheral teeth. This results in the second side surfaces 34 and 38 of the slots 30–32, respectively, having a curved configuration defined by the peripheral teeth while the side teeth cut the flat first side surfaces 32 and 36. Preferably the curvature is of substantial radius to insure long tool life in the cutter producing the slot. It can be seen in FIG. 5 that the first and second side surfaces forming the slots extend from the drilling tip to a point beyond the juncture of the entering end drilling portion 18, and the reduced portion 20. It can also be seen in the phantom section in FIG. 5 that the cone angle formed by the configuration of the two second side faces projected on a plane lying on the longitudinal axis of the drill and located between the two second side faces 34 and 38 terminates at a base of the cone falling on a plane perpendicular to the axis of the drill and spaced from the shouldered juncture of the second and third portions. This wide cone angle effectively provides a strong drill by giving strength behind the cutting faces while also giving chip clearance where the slots extend behind the entering end into the reduced shank portion for accommodation of chips. This configuration provides an entering end portion 18 which is continuous between the slots 30–32 and defines a pair of very strong segments which in total are less than 180° of arc about the periphery of portion 18.

To produce a drill of the type set forth hereinabove, it has been found convenient to centerless grind rod stock of high speed steel or tool steel which has been cut off at an appropriate length and to remove a portion of the diameter to form the reduced portion 20. The blank, so produced, is then exposed to one or more milling cutters in a predetermined orientation to form the flat surfaces 26 and 28 at the drilling end portion 18. The milled blank is then exposed, again in predetermined orientation, to a pair of milling cutters, having peripheral and side cutting teeth angularly disposed relative to said orientation to form the slots. Preferably, two milling cutters are plunged into the workpiece simultaneously to cut the slots and to counterbalance the forces of rotation during the cutting of the slots to thereby reduce the force required to maintain the drill in said predetermined orientation. The milled blank is then hardened and after hardening, may, if desired, be ground on a slide-pointer, as is well known in the art, to remove any burrs created during the milling operation or to true-up any distortion brought about by the heat treating operation. It should be recognized, of course, that equivalent methods, such as grinding, can be substituted for the milling operation and a final grind omitted if burrs are negligible.

It has been found through testing that a drill of the configuration set forth hereinabove, when compared with normal twist drills, far exceeds the performance of the so-called conventional twist drill, including those of a "split-point" variety. The simplicity of construction of this drill results in economy of manufacture which permits its use over an extended period and then disposal of the drill rather than resharpening of it. In fact, the time for drilling performance of this drill even improves slightly after use and it appears, if it is made correctly within the parameters defined hereinabove, to have self-sharpening qualities, and as a result, is capable of drilling many holes with a consistent performance while the so-called standard twist drill deteriorates steadily in performance with each subsequent hole.

While only a single embodiment has been set forth for purposes of describing this invention, it will be recognized by those skilled in the art that other embodiments can be made within the teachings of this invention, and it is my intent that I be limited only by the appended claims.

I claim:

1. A disposable drill comprising an elongated shank having one end portion cooperable with a tool for turning the drill, said shank including an entering end portion having a first predetermined diameter, and a reduced third portion having a diameter less than said predetermined diameter which connects said first end portion and said entering end portion, said entering end portion having a centered tip about the longitudinal axis of the drill and comprising a terminal ridge edge intersecting and substantially perpendicular to the longitudinal axis of the shank with symmetrically disposed substantially flat side surfaces on each side of said terminal ridge edge each diverging angularly outwardly and each intersecting said shank periphery intermediate the terminal ridge edge and said reduced third portion, said entering end portion and part of said reduced portion interrupted by a pair of oppositely disposed substantially longitudinally extending slots therein respectively defined by first and second side surfaces disposed at an angle substantially in excess of 90° relative to each other and having intermediate uninterrupted shank portions between them to provide opposed bearing surfaces which afford strength to the slotted drill shank and assure sufficient bearing surface for efficient drilling action, said first side surfaces of said slots respectively being inclined at an angle of at least 15° with respect to a plane containing the longitudinal axis of the drill with the angular inclination of said first side surfaces being such that the portion of the first side surface of each of said slots located in the trailing portion of the shank lies on a line traversing the said plane at an acute angle intermediate the tip portion of the screw and the reduced third portion, cutting edges located at the intersections of said first side surfaces of said slots and said symmetrically disposed substantially flat divergent side surfaces in the vicinity of said pointed tip, the cutting edges so provided being disposed at an angle of less than 45° to said terminal ridge edge thereby providing a relief behind said cutting edges to assure their aggressive exposure as they are exposed to a workpiece, each of said first surfaces of said slots extending from the cylindrical drill periphery radially into and beyond said terminal ridge edge and intersecting both of the symmetrically disposed flat side surfaces at opposite sides of said terminal ridge edge, said pointed tip presenting a small centrally located axially extending projection including the aforementioned terminal edge together with portions of said flat side surfaces on either side thereof for initially engaging and removing material from a workpiece, and said first side surfaces of said slots providing the cutting edges radially outwardly of said point portion to the first predetermined diameter of the entering end portion of the drill as well as the edges along the cylindrical periphery terminating at the reduced third portion to effect drilling of a workpiece aperture of said predetermined diameter.

2. A drill of the type set forth in claim 1 wherein the flat side surfaces on each side of said terminal ridge diverge angularly outwardly equal relative to the longitudinal axis of the drill shank and have an included angle of at least 105° and not in excess of 115°.

3. A drill of the type set forth in claim 1 wherein the first and second side surfaces of said longitudinally extending slots are disposed at an angle of substantially 110°.

4. A drill of the type set forth in claim 1 wherein said first side surfaces of said slots are disposed at an angle of substantially 40° relative to said terminal ridge edge to provide a minimum effective cutting surface at said terminal ridge edge and maximum relief behind said edge.

5. A drill of the type claimed in claim 1 wherein said first and second side surfaces of said slots extend from the free end of said entering end portion, as defined hereinabove, and extend axially into at least a substantial segment of said reduced third portion to thereby provide chip clearance beyond said drilling entering end portion.

6. A drill of the type claimed in claim 5 wherein said second side surfaces of said slot curves radially outwardly as it progresses from said entering end portion to its intersection with the periphery of the shank in said reduced third portion and terminates axially a substantial distance beyond the intersection of said first entering end portion having a first predetermined diameter and said reduced third portion to provide increased strength to the intermediate uninterrupted shank portions which support the cutting first surface.

7. A drill of the type claimed in claim 6 wherein said entering end portion having a first predetermined diameter has a cylindrical surface having an axial length less than the radius of said entering end portion to provide a limited axial bearing surface which thereby reduces frictional contact between the drill and the complementary aperture formed in the workpiece.

8. A drill comprising an elongated shank having a first portion cooperable with a tool for turning the drill, a second portion of reduced diameter and a third drilling end portion having a predetermined diameter larger than said reduced diameter, said third portion having a centered tip about the longitudinal axis of the drill and comprising a terminal ridge edge intersecting and substantially perpendicular to the longitudinal axis of the shank with symmetrically disposed substantially flat side surfaces on each side of said terminal ridge edge each diverging angularly outwardly and forming an included angle between the limits of 105° and 110°, each of said flat side surfaces intersecting said shank periphery intermediate the terminal ridge edge and the abrupt juncture of the said third portion and said reduced portion forming a cylindrical portion on said third portion having an axial extent less than the radius of said predetermined diameter portion, said third portion and part of said reduced portion having a pair of oppositely disposed substantially longitudinally extending slots therein respectively defined by first and second side surfaces disposed at an angle of substantially 110° relative to each other and having intermediate uninterrupted shank portions between them defining segments which in total sum are less than 180° of arc about the periphery of said cylindrical portion to provide opposed bearing surfaces which afford strength to the slotted drill shank and assure sufficient bearing surface with minimal frictional engagement with a workpiece for efficient drilling action, said first side surfaces of said slots respectively being inclined at an angle between the limits of 10° and 20° with respect to a plane containing the longitudinal axis of the drill with the angle of inclination and axial disposition of said first side surfaces being such that the portion of the first side surface of each of said slots located in the trailing portion of the shank lies on a line traversing the said plane at an acute angle within the defined limits intermediate the drilling tip portion of the screw and the reduced second portion, cutting edges located at the intersections of the first side surfaces of said slots and said symmetrically disposed substantially flat divergent side surfaces in the vicinity of said pointed tip, the cutting edges so provided being disposed at an angle of substantially 40° to said terminal ridge edge, thereby providing a relief behind said cutting edges to assure their aggressive exposure as they are exposed to a workpiece, each of said first surfaces of said slots extending from the cylindrical drill periphery of the third portion radially into and beyond said terminal ridge edge and intersecting both of the symmetrically disposed flat side surfaces at opposite sides of said terminal ridge edge, said first side surface of said slots being disposed in parallel spaced relation on opposite sides of a plane lying on the longitudinal axis of said drill and which intersects said terminal ridge edge at a 40° included angle at said axis to provide a central web having a cone angle defined by said second side surfaces with the base of the cone located on a plane perpendicular to the longitudinal axis of said drill and axially spaced from the juncture of said reduced portion and said entering end portion, the apex of said cone located at a point spaced from the tip to thereby provide increased strength to the intermediate uninterrupted shank portions which support said first side surfaces defining the cutting edges, said pointed tip presenting a small centrally located axially extending projection including the aforementioned terminal edge together with portions of said flat side surfaces on either side thereof for initially engaging and removing material from a workpiece, and said first side surfaces of said slots providing the cutting edges radially outwardly of said point portion to the first predetermined diameter of the entering end portion of the drill as well as the edges along the cylindrical periphery which terminates at the reduced portion to effect drilling of a workpiece aperture of said predetermined diameter.

9. A drill comprising an elongated shank having a drilling end of a predetermined diameter, a second portion spaced from said end having a reduced diameter relative to said predetermined diameter, and a driving portion at the end opposite the drilling end, at least one slot traversing the drilling end and a portion of the reduced diameter portion at an angle relative to a plane lying on the longitudinal axis of said shank, said drilling end having a point relieved by two symmetrically disposed flat surfaces which are angularly disposed relative to said slot to provide relief behind the cutting edge formed by said slot.

10. A drill of the type set forth in claim 2 wherein the first and second side surfaces of said longitudinally extending slots are disposed at an angle of substantially 110°.

11. A drill of the type set forth in claim 2 wherein said first side surfaces of side slots are disposed at an angle of substantially 40° relative to said terminal ridge edge to provide a minimum effective cutting surface at said terminal ridge edge and maximum relief behind said edge.

12. A drill of the type set forth in claim 3 wherein said first side surfaces of side slots are disposed at an angle of substantially 40° relative to said terminal ridge edge to provide a minimum effective cutting surface at said terminal ridge edge and maximum relief behind said edge.

13. A drill of the type claimed in claim 2 wherein said first and second side surfaces of said slots extend from the free end of said entering end portion, as defined hereinabove, and extend axially into at least a substantial segment of said reduced third portion to thereby provide chip clearance beyond said drilling entering end portion.

14. A drill of the type claimed in claim 3 wherein said first and second side surfaces of said slots extend from the free end of said entering end portion, as defined hereinabove, and extend axially into at least a substantial segment of said reduced third portion to thereby provide chip clearance beyond said drilling entering end portion.

15. A drill of the type claimed in claim 4 wherein said first and second side surfaces of said slots extend from the free end of said entering end portion, as defined hereinabove, and extend axially into at least a substantial segment of said reduced third portion to thereby provide chip clearance beyond said drilling entering end portion.

References Cited
UNITED STATES PATENTS
1,499,584    7/1924    Litchfield _____ 77—65

FRANCIS S. HUSAR, Primary Examiner

U.S. Cl. X.R.

77—67; 45—117